United States Patent [19]

Lalanne et al.

[11] 4,088,845

[45] May 9, 1978

[54] RELAY MATRIX SWITCH

[75] Inventors: Alain Lalanne, Asnieres; Yves Renaudin, Bougival, both of France

[73] Assignee: Societe Lannionnaise d'Electronique Sle-Citerel S.A., Lannion, France

[21] Appl. No.: 751,425

[22] Filed: Dec. 16, 1976

[30] Foreign Application Priority Data

Dec. 24, 1975 France .................................. 75 39730

[51] Int. Cl.² .......................... H04Q 3/00; H04Q 3/50
[52] U.S. Cl. .......................... 179/18 GE; 179/18 GF; 340/166 R
[58] Field of Search ........ 179/18 GF, 18 GE, 18 EB; 340/166 R, 174 LC

[56] References Cited

U.S. PATENT DOCUMENTS

| 3,638,193 | 1/1972 | Opferman et al. | 179/18 GF |
|---|---|---|---|
| 3,760,361 | 9/1973 | Leger et al. | 179/18 GF |
| 3,794,777 | 2/1974 | Bouchet et al. | 179/18 GF |

Primary Examiner—Thomas A. Robinson
Attorney, Agent, or Firm—Sughrue, Rothwell, Mion, Zinn and Macpeak

[57] ABSTRACT

A relay matrix which constitutes an array of switches providing connection points between a set of "horizontal" inputs and a set of "vertical" outputs, has $n$ relays per column disposed in $p$ columns. Each relay column is associated with a register which fulfills the functions of controlling and storing the state of the relays of the column. The invention can be applied to switching systems and in particular to automatic telecommunication exchanges.

10 Claims, 2 Drawing Figures

RELAY MATRIX SWITCH

The invention relates to a relay switch comprising at least one matrix for providing cross-points between a set of "horizontal" inputs and a set of "vertical" outputs and suitable for use in a switching system, in particular in automatic telephone or telegraph exchanges.

Known reed relay matrices either use two-contact magnetic hold relays or else use three contact relays, two of the contacts being used for the through connection as with the magnetic hold relays while the third contact is used for feeding the winding of the relay to keep it in the operated position, i.e. serving as a store for the marking condition.

The invention provides a matrix switch using relays with only the two contacts used by the connection and the storing function being fulfilled by electronic circuits.

The invention relates to a relay switch comprising a matrix of crosspoints between a set of "horizontal" inputs and a set of "vertical" outputs, each cross-point being controlled by a relay individual to the cross-point and each column of relays being controlled by a register individual to the column for storing data indicative of the relay to be operated in the column.

The invention also relates to a relay switch wherein each register is connected to its column of relays via a one-in-N decoder circuit.

In an nXp cross-points matrix, any one of the n cross-points in each of the p verticals may be operated. This is effected by means of a register for each vertical storing a number corresponding to a desired one of the n points which it controls. This number can be stored in binary code or in any other code. A decoder fed by the register supplies a 1/n code which is amplified to energize the appropriate one of the relays controlling the vertical.

An embodiment of the invention is described hereinbelow by way of example with reference to the accompanying drawings, in which.

Figure 1:
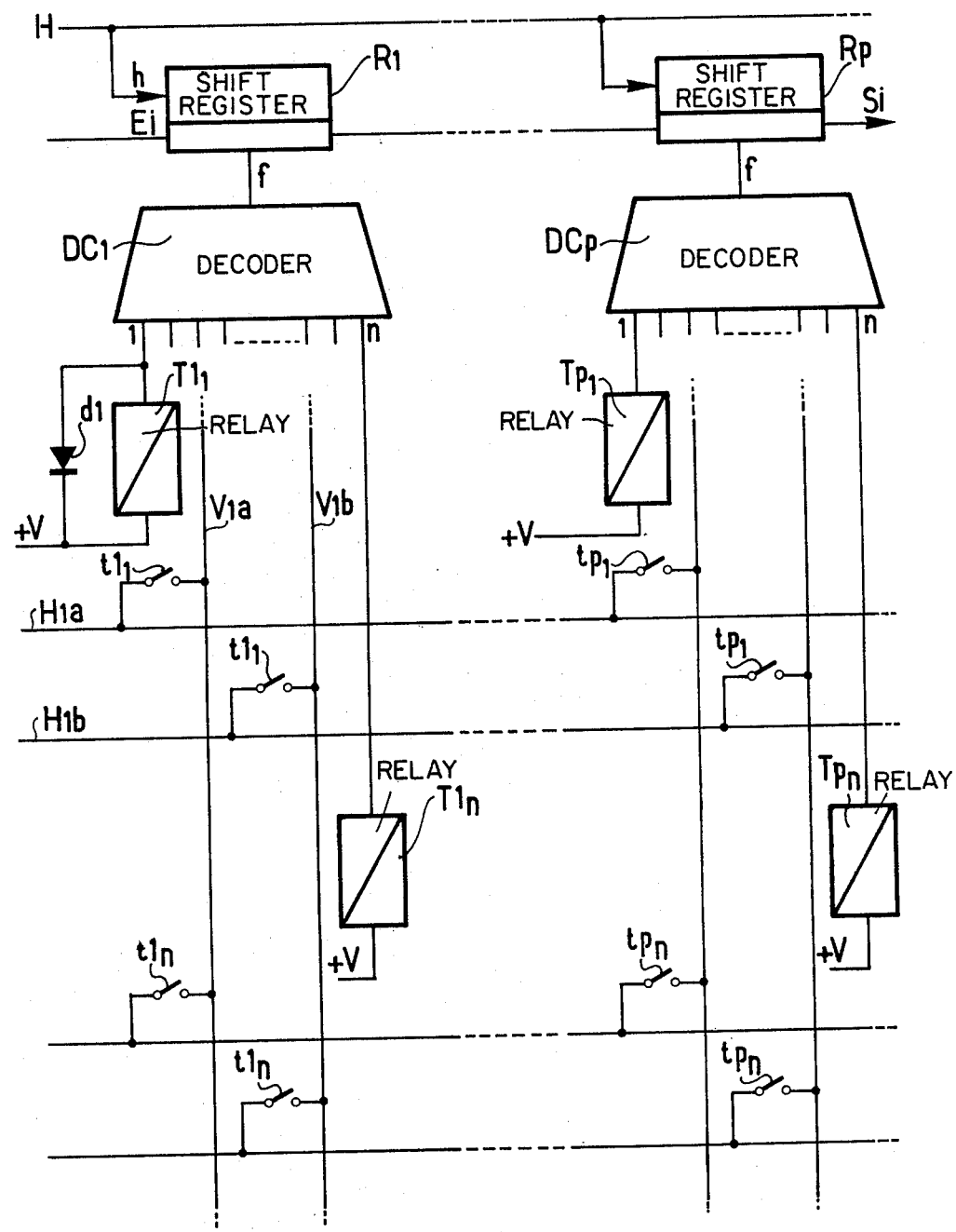
FIG. 1 shows schematically a matrix embodying the invention.
Figure 2:
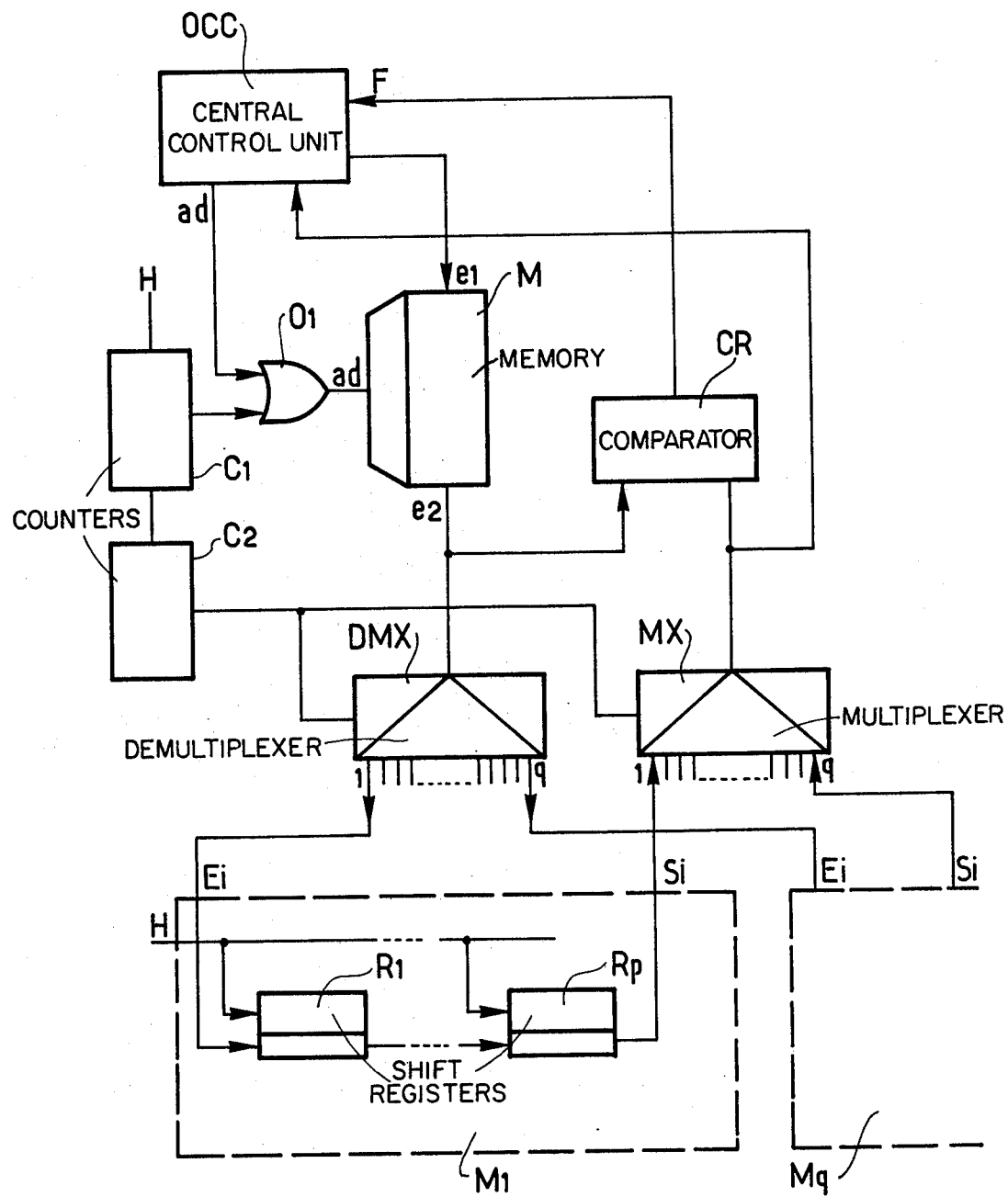
FIG. 2 shows the control circuit for a group of $q$ matrices.

The matrix of FIG. 1 has $p$ columns of relays, each column having $n$ relays $T1_1$ to $T1_n$ for the first column to $Tp_1$ to $Tp_n$ for the $p$th column. Each column of relays has a corresponding shift register R1 to Rp and each one of the shift registers R1 to Rp has a data input Ei and a clock input $h$, the clock inputs $h$ being connected to a common clock line H. The registers R1 to Rp are series connected, an output of one register being connected to the data input of the following register. The output Si of the register Rp is connected to a central logic control unit (FIG. 2). The parallel data outputs of each register are connected by a connection $f$ to the inputs of decoders DC1 to DCp.

Each decoder $DC_1$ to $Dc_p$ has $n$ outputs 1 to $n$ which are connected to $n$ control windings of the relay $Tl_1$ to $T1_n$. The first relay $T1_1$ for example has two normally open contacts t11 which are situated at the cross-point of the horizontal H1 and the vertical V1 of the matrix. A diode such as d1 is connected across the terminals of the relay windings to protect the control circuit. All of the relay windings are also connected to a common potential $+V$. An amplifier (not shown) should be connected between the output of the decoder and the relay winding if the output of the decoder has insufficient power to drive the relay directly.

The horizontal H1 is constituted by two wires H1a and H1b, while the vertical V1 is similarly constituted by two wires V1a and V1b. The other horizontals and verticals are similarly constituted.

The matrix of $p$ columns of $n$ relays may be used, for example, as a space connection network with metallic contacts arranged in $p$ verticals and $n$ horizontals and whose cross-points each include one of the relays.

In the example given each relay has two normally-open contacts corresponding to the two wires of a line. In the following part of the text, for simplicity's sake, the assembly formed by these two contacts will be called a "connection point".

Each column $i$ where $1 < i < p$ has its corresponding register Ri for storing a character indicative of the relay of the column to be selected. This character stored in the register Ri is passed to a decoder DCi. The decoder has the property of actuating only one among $n$ of its outputs as a function of the character supplied to its input.

The actuated output of the decoder applies a (0) potential to one side of the corresponding relay winding and with the other side of the winding being permanently connected to the voltage $+V$ the relay operates and it is the only one to operate in the column. The same operation is carried out on each of the columns independently.

Data relating to the cross-points of the matrix, e.g. the addresses of the cross-points, is injected at the input Ei of the first register R1 and the words characteristic of each of the addresses are written in the corresponding registers. For example, the word characteristic of a contact $T1_1$ of a relay $T1_1$ will be a "one" written in the register Ri.

The shift registers are directly addressable by the electronic control circuits. They are made accessible by means of the clock H which causes the advance of the data stored in the registers. With the data being injected at the input Ei and the various registers being in series, it is possible to rapidly load all the characters which correspond to the cross-points in the matrix which should be operated. The registers can be loaded in a few microseconds.

Because of the high speed of the circuits, all the data can be up-dated each time the state of a single relay is to be modified. To do this the character corresponding to this relay is modified in the appropriate register and all the bits corresponding to all the registers of the matrix are reinjected. There is practically no difference between the loading of a single point and the loading of a set of points. It is possible to control the operating state of the circuits and to check the true state of the network by re-reading the registers without any need for extra circuits.

FIG. 2 shows the logic control unit of a group of $q$ matrices Ml to Mq analogous to the one shown in FIG. 1.

To avoid disturbing the memory state of the network as a whole which could be created by the proximity of mechanical relays to semiconductor memories, an auxiliary memory M is used. This auxiliary memory is distant from the relays and contains the same data as the registers which are close to the relays. The "same" data may be a transcoded version of the register data provided the transcoding is simple. Two series connected counters C1, C2 are also provided with the auxiliary memory for synchronising the memory scanning and the register scanning. The assembly is controlled by a central control unit OCC which controls the periodic transfer of the data from the memory to the registers in the matrices. The memory M has an addressing control input ad connected to the central control unit OCC via an OR gate O1 which has a second input connected to the counter C1. The memory M also has a write input e1 connected to the central control unit OCC by a data line and a read output e2 connected to a comparator CR and to the inputs Ei of the registers of the matrices M1 to Mq via a demultiplexer DMX. The outputs Si of the matrix registers are connected to the comparator CR via a multiplexer MX which also has an input connected to a control output of the counter C2. The counter C2 has an input connected to an output of the counter C1 and its control output is also connected to an input of the demultiplexer DMX. The demultiplexer DMX has $q$ outputs connected to the respective data inputs Ei of the $q$ matrices M1 to Mq. Likewise, the multiplexer MX has q inputs connected to the respective data outputs Si of the q matrices M1 to Mq.

The imput e1 of the memory M transfers the connection change data to be written in the memory M while the input ad transfers the appropriate address to the memory. When it is required to modify the contents of the memory the address which corresponds to a point which is to be modified is supplied by the central control element OCC and is sent to the memory (input ad). At the same moment, another data item corresponding to the point number to be modified in the addressed column is also sent to the memory by the central control unit (input ad).

The data read at the output of the memory is applied to one of the matrices; it enters the first shift register at a clock pulse rate which is the same as that of the counter C1. As the counter and the clock deliver these pulses, the data in all the registers of the matrix in question is shifted, thereby propagating the data through the registers. At the output of the last register, the data is returned to the central control unit. The output data from the last register is compared with the input data to the first register by the comparator CR which gives a signal via a wire F to the control unit OCC wherever the previous data differs from the new data. Normally the difference recorded corresponds to a desired modification to be made in the register. If a modification is deliberately made in the memory, corresponding to the change in a connection or disconnection of a crosspoint, the central control unit OCC takes into account the difference expected between the input data and the output data of the registers. The central control unit OCC can be either a computer in the case of central computer exchanges or a specialized "network control unit". The function of this unit is to control a connection network and consists of finding a through path for a calling subscriber.

In order to use only one comparator CR, the data is multiplexed so that the comparator can be used for comparing data coming from any of the other matrices. Likewise the memory M has access to any of the matrices via the demultiplexer DMX.

The comparator CR also delivers a "fault" signal on the wire F in case of disturbances in the circuits due to a permanent fault, e.g. an electric fault in the circuit.

The data is stored in the central memory M which is common to the $q$ matrices. The memory is read cyclically and the output of the memory is supplied to one out of the $q$ matrices. This data circulation continues permanently through one or other of the matrices in the series and so comparator CR continually receives an output from the registers and the output of the memory. The circulation of the data enables the state of the crosspoints to be confirmed within a scanning period and the state of these points to be changed when a connecting or disconnecting marking instruction is sent out.

The counters C1, C2 provide a scanning effect since the memory is common to a group of matrices. The first counter scans the data through one matrix and the second counter C2 sets the demultiplexer and the multiplexer to select the various matrices to which data is to be sent.

When the first counter has completed a cycle, it will have scanned the shift registers and a part of the memory so that all of the data of one matrix will have been renewed. The first counter C1, by recycling, will cause the advance of the second counter C2 which will change matrices and a new cycle of the first counter will renew all the data of the second matrix and thus, subsequently, all the matrices will successively be scanned, renewing the data which was contained in these matrices.

When it is required to change the state of one of the connection points in any matrix, it is sufficient to access the memory M and write the new data in the address corresponding to the matrix. The scanning of the counters will automatically up-date the registers. The point concerned by this change will be connected or disconnected according to what has been written in the memory.

The comparator CR receives the data at the output of registers as well as the data coming directly from the output of the memory. These two data sets should be equal allowing for a delay time equal to the shift time of the registers. Hence, there is a possibility of periodically renewing the data in the registers so that if there is a disturbance lasting less than the register scanning time, the relays cannot reproduce this disturbance. A faulty operation signal is only valid if the disturbance lasts longer than the scan time. The same clock H is applied to the counter C1 and to the input of the registers so that the memory and the registers are scanned simultaneously.

Applications

The matrix system records the paths connecting a subscriber set to a junction or interconnecting two subscriber sets. The memory represents the state of the network at a given instant; it constitutes an image of the registers and is modified each time the network has to be modified, i.e. when a new connection point is required to be connected or when one/of these points is to be disconnected.

One advantage of the system resides in the fact that if the central control unit OCC, which searches for paths, does not know the state of the network, it can test the state of the network by re-reading the contents of the memory and of the registers. In the case of faulty operation of the central control unit, this possibility of re-reading the contents of the registers makes it possible for the traffic to resume.

Another advantage of the system consists in the possibility of changing contact chains i.e. paths through a switching system. As each register associated with a vertical is independent from the others, the fact of having operated one connection point in one vertical does not prevent the possibility of operating any points in any of the other verticals. In particular, the cross-points of the same order can be operated in two different verticals. Indeed, a single horizontal may be simultaneously connected to several verticals and this facility can be readily used to change contact chains. This possibility of changing contact chains ensues naturally from the device without requiring any extra equipment. It is sufficient to write a same number in at least two different registers. This makes a change of chain possible in any stage of the network. this disposition also makes it possible also to insert a test unit into a connection to check the operation thereof.

Another advantage of the system resides in the fact that the circuits which fulfill the memorizing function are electronic circuits, and are hence fast. The advantage of using high speed circuits is that a single control unit is capable of controlling the traffic for a large-exchange whereas in known devices such as those mentioned hereinabove, it is necessary to wait for the connecting of the various connection points, thereby limiting the speed of the system and consequently limiting the traffic capacity. The logic control unit can be specialized stage by stage or may be common to the network as a whole.

Each time another point is connected in the matrix, it is necessary to shift the registers of the matrix. Due to this shift, there will temporarily be no control of the relays for a very short time, and hence therewill be no effect on the relays which remain unchanged in position. Indeed, the shift of the data in the registers takes place in a time which is in the order of a hundred or so microseconds, whereas the operation of the relays takes place only after several milliseconds.

If it is necessary to modify the second register it is necessary to make all the data of one matrix circulate because of the series connection of the shift registers: the state of the second register will flicker successively through the states of the other registers. During the whole shifting process, the contents of each register will be thus disturbed but this disturbance is sufficiently short for the relays not to have sufficient time to switch. Therefore only permanent modifications can modify the state of the contacts of the relays.

Registors can thus be scanned even when there is no change to be effected and a continuous check can be made on the actual state of the network.

According to the circuits used, the storing, decoding and amplifying functions can be separate or combined in one or severl components.

The structure adopted enables the registers to be formed by means of bistable flip-flops of any type or technology enabling the use of the least expensive bistable flip-flops and hence a reduction of the cost of the system.

The system described enables;

A reduction in cost of the cross-points: a gain of one contact per cross-point and very wide tolerances on the hold and release voltages of the relays, thereby avoiding the need for quality selection of the relays.

Elimination of interface circuits between the matrices and the electronic control circuits. Since the register is itself an electronic circuit, it is directly addressable by the electronic control circuits;

A reduction in the number of wiring connections in a ratio of 2 (cutting out of the hold and marking wires);

It is possible to check the true state of the network by re-reading the registers. In conventional devices, such a check requires extra circuits;

Contact chain changing operations do not require any extra equipment and can be effected at any state in the network.

The system also has advantages connected with the very high control speed (a few microseconds):

A network having large dimensions, serving e.g. 60,000 subsoribers, can be controlled by a single central marker (a second marker ensures operational security), this considerably simplifying the design of the system;

When the network is blocked, it may be possible to rearrange the state of the network to make a connection possible.

The operating speed of the system is higher than that of conventional systems and enables the simplification of auxiliary devices connected to networks using the system. It would be impossible to form the same facilities with slower conventional devices.

It is possible to select simultaneously several or all of the relays which correspond to a single horizontal, feeding several columns or all of those which correspond to this horizontal.

The facility of changing th contact chain at any point of the network without any extra equipment affords different possibilities:

(a) The traffic capacity of the network will be improved by preferably changing the contact chain as close as possible to the outputs of the network so as to minimize the number of cross-points used;

(b) A test unit can have access to any cross-point of a contact chain set up and check conductor continuity stage by stage. This makes it possible to test for and locate defects in the network;

The control units of a network search for paths either on the basis of a memory image or by testing the contact of relays of the network. The matrix is compatible with either of these systems since the re-reading of the registers supplies the occupation data of the connection points as does the testing of contacts;

When two central units both use the network, they cannot work with the network simultaneously. This gives rise to restrictions in the design of the system. These constraints are here very small: it is for example possible to assign work times of a few hundreds of S to each unit by a drive clock.

What we claim is:

1. A relay switch comprising: a matrix of cross-points between a set of "horizontal" inputs and a set of "vertical" outputs, a relay associated with each cross-point, each cross-point controlled by said relay associated with the cross-point, each column of relays in said matrix controlled by a register individual to the column for storing data indicative of the relay to be operated in the column, an auxiliary memory containing data representative of the status of said relays in said matrix, and a control unit, said auxiliary memory maintaining said relays in accordance with data stored therein and said control unit updating said memory in accordance with switching instructions.

2. A relay switch according to claim 1 wherein each relay has a winding associated with it and each register is connected to a column of windings of said relays via a one-in-N decoder circuit.

3. A relay switch according to claim 1 wherein the registers of the several columns of the switch are connected in series as a shift register having a clock input common to all the registers, a data input to the first register and a data output from the last register of the series connection.

4. A relay switch according to claim 3 including a protective diode connected accross the terminals of winding of each relay.

5. A relay switch according to claim 1 wherein each relay is a reed relay.

6. A relay switch according to claim 5 wherein each relay has only two switchable metallic circuits.

7. A relay switch system according to claim 1 wherein the auxiliary memory is associated with counter means arranged to control scanning through the registers of the plurality of relay switch matrices.

8. A relay switch system according to claim 1 including a comparator for comparing data sent from the auxiliary memory to the registers with data previously stored in the registers.

9. A relay switch system according to claim 8 including a multiplexer correcting the relay switch matrices to the comparator and a demultiplexer connecting the auxiliary memory to the matrices, both multiplexer and demultiplexer being controlled by the same counter.

10. A relay switch system according to claim 9 including means for writing data relating to relays of the same order into different registers of a single relay switch matrix thereby causing one horizontal to be connected to a plurality of verticals.

* * * * *